(12) United States Patent
Masuda et al.

(10) Patent No.: US 6,634,707 B2
(45) Date of Patent: Oct. 21, 2003

(54) SEAT APPARATUS FOR AUTOMOBILE

(75) Inventors: Kou Masuda, Yokohama (JP); Takeshi Ito, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 10/178,953

(22) Filed: Jun. 25, 2002

(65) Prior Publication Data
US 2002/0195846 A1 Dec. 26, 2002

(30) Foreign Application Priority Data

Jun. 26, 2001 (JP) .......................... 2001-192593
Oct. 2, 2001 (JP) .......................... 2001-306478

(51) Int. Cl.[7] .............................................. B60N 2/42
(52) U.S. Cl. ................................................ 297/216.1
(58) Field of Search ........................... 297/391, 408, 297/216.1, 216.12, 216.13, 216.14

(56) References Cited

U.S. PATENT DOCUMENTS 6,179,379 B1 * 1/2001 Andersson
6,213,549 B1 * 4/2001 Wieclawski
6,273,511 B1 * 8/2001 Wieclawski
6,478,373 B1 * 11/2002 Hake et al.

FOREIGN PATENT DOCUMENTS

JP   2000-118280   4/2000

* cited by examiner

Primary Examiner—Milton Nelson, Jr.
(74) Attorney, Agent, or Firm—Arent Fox Kintner Plotkin & Kahn

(57) ABSTRACT

A seat apparatus comprises: a seat back provided with a seat back frame; a head rest frame supported to the seat back frame via a tilting shaft so as to be freely tilted in forward and rearward directions; a head rest supported to an upper side of the tilting shaft in the head rest frame; a gas actuator mounted to the seat back frame, operated due to a momentary gas generation and tilting the head rest frame in a direction in which the head rest is tilted forward at a time of the operation; and an acceleration sensor for detecting an acceleration of the automobile in the forward and rearward directions. The gas actuator is operated when the acceleration sensor detects a predetermined or greater acceleration.

5 Claims, 4 Drawing Sheets

SEAT APPARATUS FOR AUTOMOBILE

BACKGROUND OF THE INVENTION

Field of the Invention

The present invention relates to a seat apparatus for a automobile provided with a head rest, and more particularly, relates to a seat apparatus for a automobile provided with a structure reducing risk of exposing a passenger to whiplash injury at the time of a rear-end collision or the like.

In order to prevent the passenger from being exposed to whiplash injury when a rear-end collision occurs in an automobile or the like, a head rest is provided at an upper side of a seat cushion. An impact at a time of the rear-end collision generates a forward acceleration of the entirety of the seat and a rearward inertia of the passenger, whereby the seat back tilts to a rear side and the upper body of the passenger floats up to an obliquely upper and rear side. Accordingly, when the head rest is provided in a fixed manner, the head portion of the passenger shifts to an upper side of the head rest, so that a large load is applied to the cervical part of the neck and it is difficult to reliably prevent the whiplash injury.

In order to solve the problem mentioned above, a structure in which the head rest is actively tilted forward at a time of the rear-end collision is disclosed, for example, in Japanese Unexamined Patent Publication No. 2000-118280 or the like. The seat for the automobile described in the publication is constructed such that the head rest is supported by a head rest supporting frame which is mounted to a seat back frame so as to freely move in forward and rearward directions, and a pressure receiving member receiving a pressing force of a back of the passenger is fixed to a lower portion of the head rest supporting frame. Furthermore, when a load of the passenger is applied to the seat back at a time of the rear-end collision, the pressure receiving member receives the load, the head rest supporting frame rotates to a front side, and the head rest is tilted forward following thereto, whereby it is possible to support the head portion of the passenger from a rear side so as to securely prevent whiplash injury.

However, when a physical condition of the passenger, a driving condition of the automobile, or the like, does not conform to the structure mentioned above, for example, when the weight of the passenger is low or the automobile speed is low, there have been cases in which sufficient effect could not be achieved due to insufficient forward tilting amount of the head rest. Furthermore, since the structure is made such that the pressure receiving member is arranged between a pair of right and left lower frame plates constituting the seat back frame, the rate of the passenger load applied to the lower frame plates is increased in the case in which the distance between the lower frame plates is small or the lower frame plates are arranged close to the back of the passenger, so that a sufficient load is not transmitted to the pressure receiving member. As a result, there are cases in which the forward tiling amount of the head rest is insufficient and a sufficient effect could not be achieved. Furthermore, in the structure in which the pressure receiving member is provided, the weight and the size of the structure disadvantageously increase.

SUMMARY OF THE INVENTION

Accordingly, an object of the present invention is to provide a seat apparatus for a automobile which can reliably and sufficiently achieve an effect of reducing whiplash injury without regard to the physical condition of a passenger, the traveling condition of the automobile, the structure of the seat back frame or the like, and can be provided as a compact apparatus.

In order to achieve the object mentioned above, in accordance with the present invention, there is provided a seat apparatus comprising: a seat back provided with a seat back frame; a head rest frame supported at the seat back frame via a tilting shaft so as to be freely tilted in forward and rearward directions; a head rest supported to an upper side of the tilting shaft in the head rest frame; a gas actuator mounted at the seat back frame, operated due to a momentary gas generation and tilting the head rest frame in a direction in which the head rest is tilted forward at a time of the operation; and an acceleration sensor detecting an acceleration of the automobile in the forward and rearward directions, wherein the gas actuator is operated when the acceleration sensor detects a predetermined acceleration or more.

In accordance with the present invention, when a forward acceleration shock is detected by the acceleration sensor due to a rear-end collision of a automobile or the like, the gas actuator is operated, and the head rest is tilted forward together with the head rest frame. A head portion of the passenger is supported by the forward tilting head rest, and a reduction of whiplash injury is anticipated. Since the forward tilting of the head rest is executed not by receiving the load of the passenger but by detecting the acceleration, it is possible to reliably and sufficiently tilt the head rest forward without regard to the physical condition of the passenger, the driving condition of the automobile, or the structure of the seat back frame. As a result, it is possible to effectively reduce the whiplash injury. Furthermore, since a compact gas actuator can be sufficiently used, it is possible to make the apparatus compact as desired.

In accordance with a preferable aspect of the present invention, there is provided a holding device for maintaining an operating state of the gas actuator so as to maintain the forward tilting state of the head rest. Since the forward tilting state of the head rest is maintained even after the gas actuator is operated, by employing this aspect, the state in which the head rest supports the head portion of the passenger so as to prevent the whiplash injury can be continuously maintained.

Furthermore, in accordance with a preferable aspect of the present invention, a buffering mechanism which allows the head rest frame to tilt forward when the load of forward tilting the head rest frame via the head rest is input to the head rest frame, and prevents the gas actuator from being operated is provided between the head rest frame and the gas actuator. In accordance with this aspect, even when the forward tilting load is input to the head rest for some reason, the load is buffered by the buffering mechanism and is not transmitted to the gas actuator. That is, a reverse operation in which the gas actuator enters into an operating state by the head rest tilting forward does not occur, whereby malfunction of the gas actuator is prevented. In the case of this aspect, it is more preferable that an urging member for urging the head rest frame to a normal position be provided.

DESCRIPTION OF THE PREFERRED EMBODIMENTS

A description will be given of an embodiment in accordance with the present invention with reference to FIGS. 1 to 4.

Figure 1:
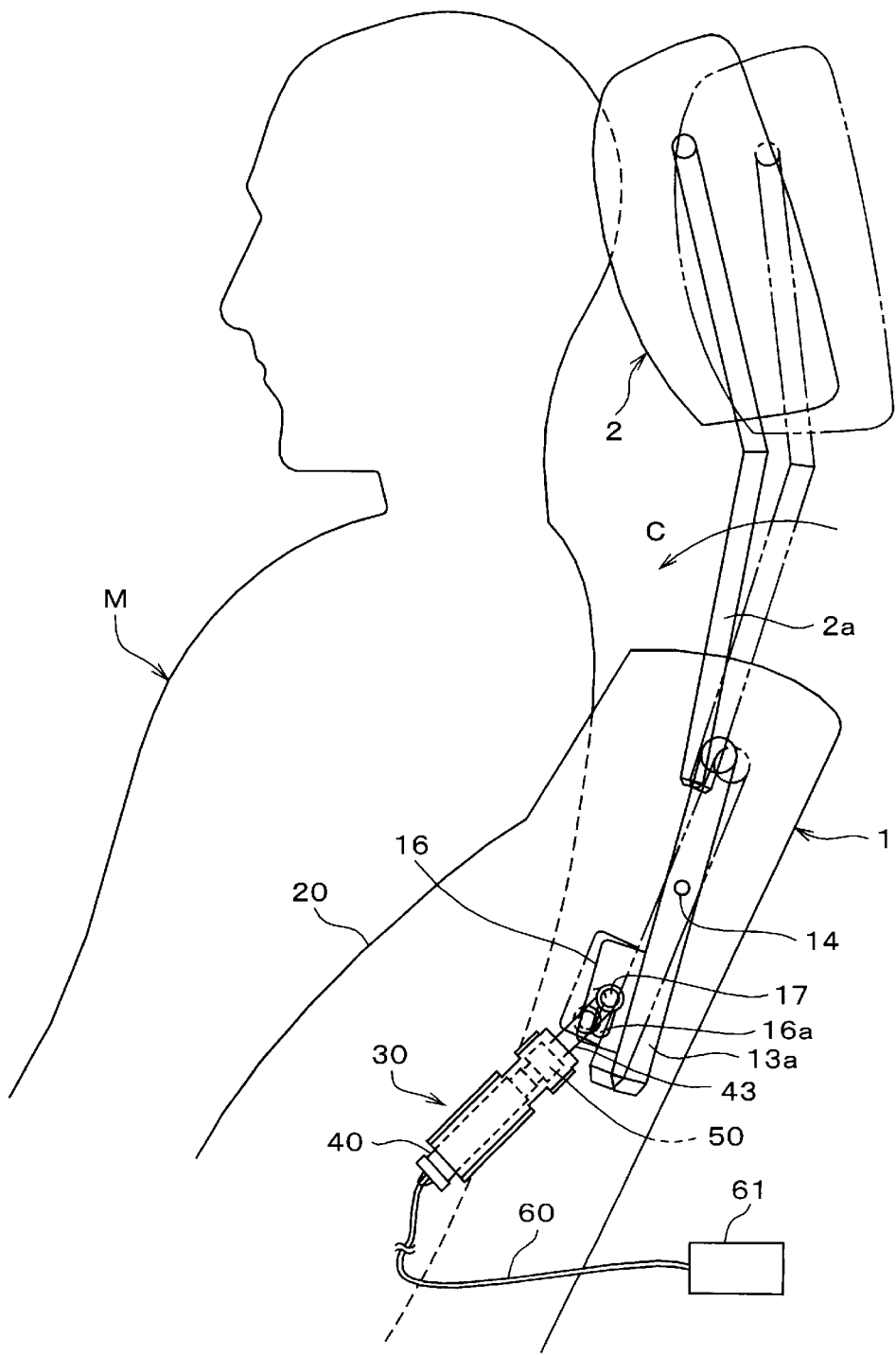
FIG. 1 is a side view showing a seat apparatus for a automobile in accordance with an embodiment of the present invention.
Figure 2:
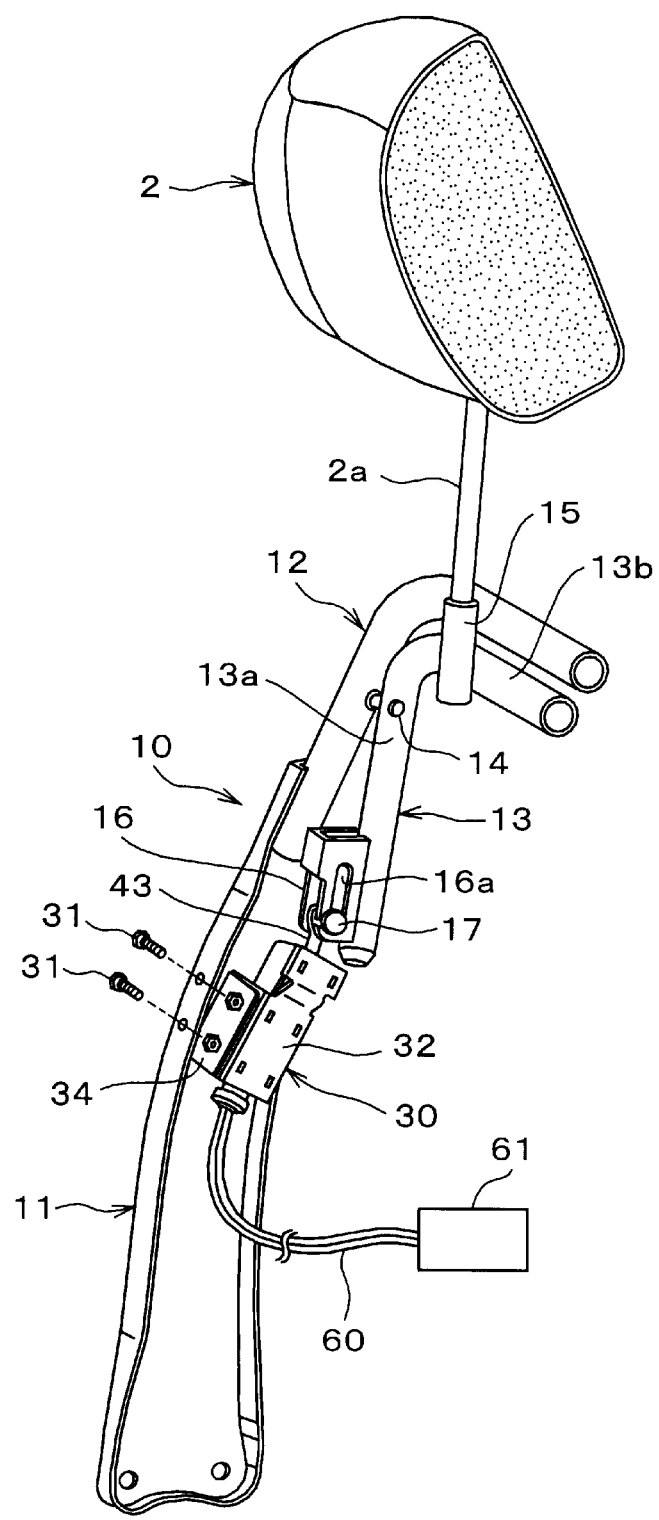
FIG. 2 is a perspective view of a part of the seat apparatus for the automobile in accordance with the embodiment of the present invention.

FIG. 1 shows a seat back 1 to which a seat apparatus for a automobile in accordance with an embodiment is applied and a passenger M, and reference numeral 2 denotes a head rest. FIG. 2 shows an internal structure of the seat back 1, and the seat back 1 is provided with a seat back frame 10 and a cushion 20 shown in FIG. 1.

A description will be given of the internal structure of the seat back with reference to FIG. 2. The seat back frame 10 is formed in a substantially inverted U-shape, and is structured such that a U-shaped upper frame 12 made of a pipe material is bridged and welded between upper ends of a pair of right and left side frames 11 (only one side is illustrated in FIG. 2) made of a sheet metal in a state of directing both ends of the upper frame 12 downwardly. The seat back frame 10 is mounted to a seat cushion via a reclining apparatus (neither is illustrated) arranged at a lower end of each of the side frames 11 so as to be freely tilted.

A U-shaped head rest frame 13 is supported at the upper frame 12 of the seat back frame 10 so as to be freely tilted in forward and rearward directions via tilting shafts 14. This head rest frame 13 is arranged in a state of being received in an inner side of the upper frame 12 so as to direct both ends downwardly. The tilting shafts 14 are passed to upper portions of right and left vertical pipe portions 13a extending in a vertical direction of the head rest frame 13. A pair of right and left cylindrical head rest holders 15 (only one side is illustrated in FIG. 2) are welded to a horizontal pipe portion 13b extending in a lateral direction of the head rest frame 13, and stays 2a of the head rest 2 are inserted to these head rest holders 15 in such a manner as to be detachable and are capable of being fixed at an optional position. Accordingly, the head rest 2 is structured so as to be integrally tilted with the head rest frame 13 in forward and rearward directions.

Furthermore, a bracket 16 in which a long hole 16a extending in parallel to the vertical pipe portion 13a is formed is welded to a front side of a lower portion of one vertical pipe portion 13a in the head rest frame 13. As shown in FIG. 2?, the head rest frame 13 is set in a state in which the vertical pipe portion 13a is tilted slightly backward at a normal use angle of the seat back 1.

Figure 3:
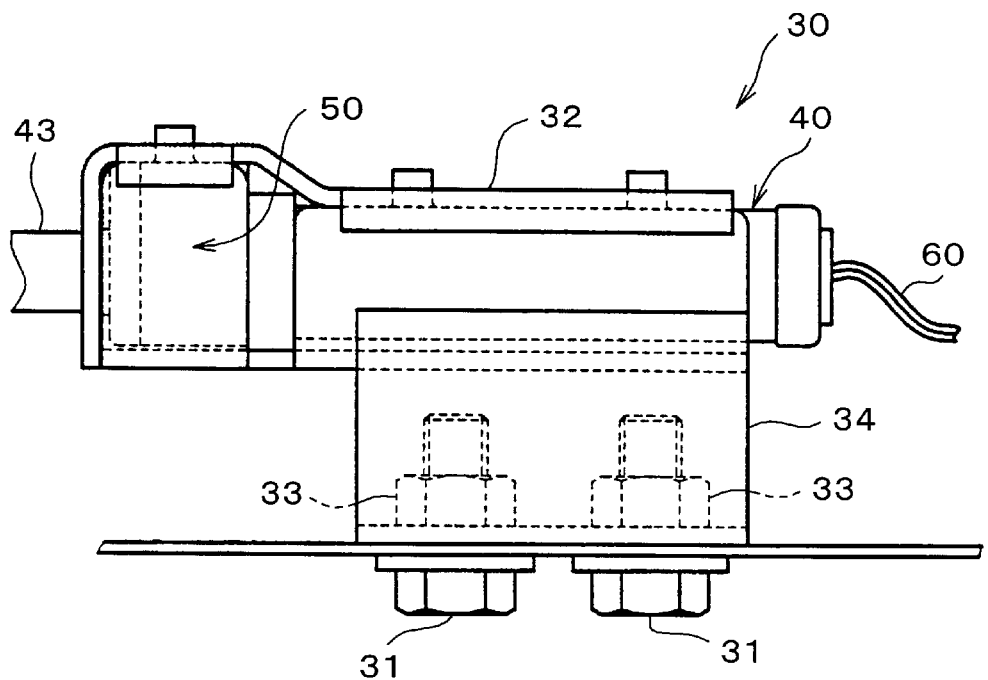
FIG. 3 is a side view of the gas actuator in accordance with the embodiment of the present invention.

A gas actuator 30 is fixed to an inner side of the side frame 11 in a side in which the bracket 16 is arranged, by bolts 31. The gas actuator 30 is provided with a cylinder portion 40 and a lock portion 50 connected to one end of the cylinder portion 40 as shown in FIG. 3, and is structured such that these elements are integrally formed by a cover 32. The cover 32 has a bracket portion 34 in which nuts 33 are welded to an inner side, and the bracket portion 34 is fixed to the side frame 11 by bolts 31 screwed to the nuts 33. In this fixed state, as shown in FIG. 1, the cylinder portion 40 is arranged at a lower side and the lock portion 50 is arranged at an upper side.

Figure 4:
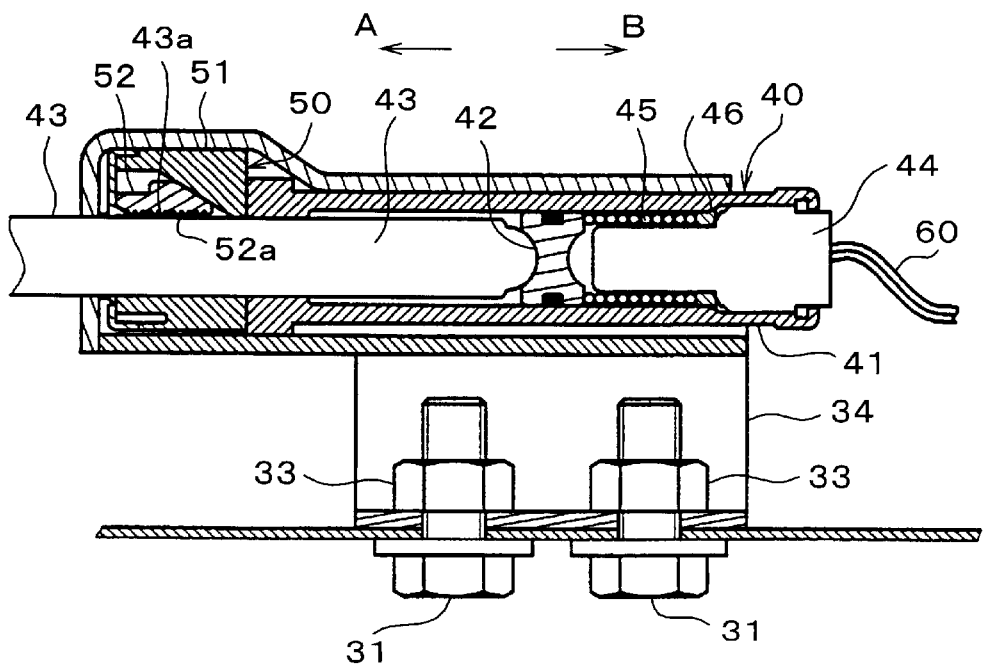
FIG. 4 is a vertical cross sectional view of FIG. 3.

A description will be given of an internal structure of the gas actuator 30 with reference to FIG. 4. The cylinder portion 40 has a cylinder 41. A piston 42 is slidably fitted to an inner portion of the cylinder 41, a rod 43 is inserted to a side of the lock portion 50 in the piston 42, and a gas generator 44 is fixed to an end portion in an opposite side. The gas generator 44 has a small diameter in a portion from a fixed portion to the cylinder 41 to the piston 42 side, and a compression spring 45 constituted by a coil spring is attached to a periphery of the small diameter portion. The compression spring 45 is in a compressed state between a ring-like spring seat 46 fixed to a base end side of the small diameter portion and the piston 42 so as to urge the piston 42 in a direction of the lock portion 50 (the direction of arrow A in FIG. 4). The compression spring 45 is provided so that the piston 42 is always closely contacted to the rod 43 without regard to an insertion variability of the rod 43. The rod 43 is structured such that one end is brought into contact with the piston 42, and another end side protrudes to an external portion through the lock portion 50 from the cylinder 41.

The lock portion 50 has a cylindrical case 51, and a lock piece 52 in which a ratchet gear (a holding device) 52a is formed received within the case 51. A ratchet groove (a holding device) 43a engaging with the ratchet gear 52a is formed on an opposing surface to the lock piece 52 on a peripheral surface of the rod 43. The ratchet gear 52a of the lock piece 52 engages with the ratchet groove 43a of the rod 43, whereby movement of the rod 43 in a backward direction, that is, in an internal direction of the cylinder (the direction of arrow B in FIG. 4) is restricted, and movement in a forward direction, that is, a direction of protruding out from the cylinder (the direction of arrow A in FIG. 4) is allowed.

As shown in FIG. 1, the gas actuator 30 mentioned above is set to an angle at which an axial direction of the rod 43 tilts rearward rather than the vertical pipe portion 13a of the head rest frame 13. Furthermore, a front end of the rod 43 is fixed to a pin 17 moving along the long hole 16a of the bracket 16. In general, the pin 17 is positioned at a lower end of the long hole 16a of the pin 17, and the rod 43 is engaged with the bracket 16 via the pin 17, whereby a tilting motion of the head rest frame 13 is restricted. Furthermore, when the rod 43 moves forward, the pin 17 pushes the lower portion (the lower portion rather than the tilting shaft 14) of the head rest frame 13 while moving to an upper side. Accordingly, the head rest frame 13 and the head rest 2 are tilted forward in the direction of arrow C in FIG. 1.

The gas generator 44 of the gas actuator 30 is connected to an acceleration sensor 61 placed in the automobile via a signal harness 60, as shown in FIGS. 1 and 2. When the acceleration sensor 61 detects a predetermined or greater acceleration in the forward and rearward directions, a detected signal is input to the gas generator 44 via the signal harness 60, and a gas is instantaneously generated from the gas generator 44. When the gas generator 44 is operated in the manner mentioned above, the piston 42 moves in a direction of the lock portion 50, whereby the rod 43 moves forward.

The above is a structure for the seat apparatus in accordance with the present embodiment. In accordance with this seat apparatus, in the case in which the automobile is suddenly accelerated to the front side due to the rear-end collision or the like, and the acceleration is equal to or greater than a predetermined value, the gas actuator 30 is operated and the rod 43 moves forward. Then, since the rod 43 pushes the lower portion of the head rest frame 13 to the rear side while moving the pin 17 to the upper side, the head rest frame 13 is tilted forward, and the head rest 2 is tilted forward and moves to the front side. Accordingly, the head portion of the passenger M is supported by the forward tilting head rest 2. A solid line in FIG. 1 shows the state at that time. The head rest 2 positively moves to the front side so as to support the head portion of the passenger M in the manner described above, whereby it is possible to reduce whiplash injury. Since the state in which the rod 43 moves forward is maintained by the ratchet gear 52a of the lock piece 52 in the lock portion 50 being engaged with the ratchet groove 43a of the rod 43, the forward tilting state of the head rest 2 is continuously maintained after the gas actuator 30 is operated.

In accordance with the present embodiment, since the forward tilting of the head rest 2 is executed not by receiving the load of the passenger M but by detecting an acceleration, it is possible to securely and sufficiently tilt the head rest 2 forward without relation to the physical condition of the passenger M, the driving condition of the automobile, or the structure of the seat back frame 10. As a result, it is possible to effectively reduce whiplash injury. Furthermore, since a compact structure is sufficient to achieve the operation of the gas actuator 30, a compact apparatus is possible.

Figure 5:
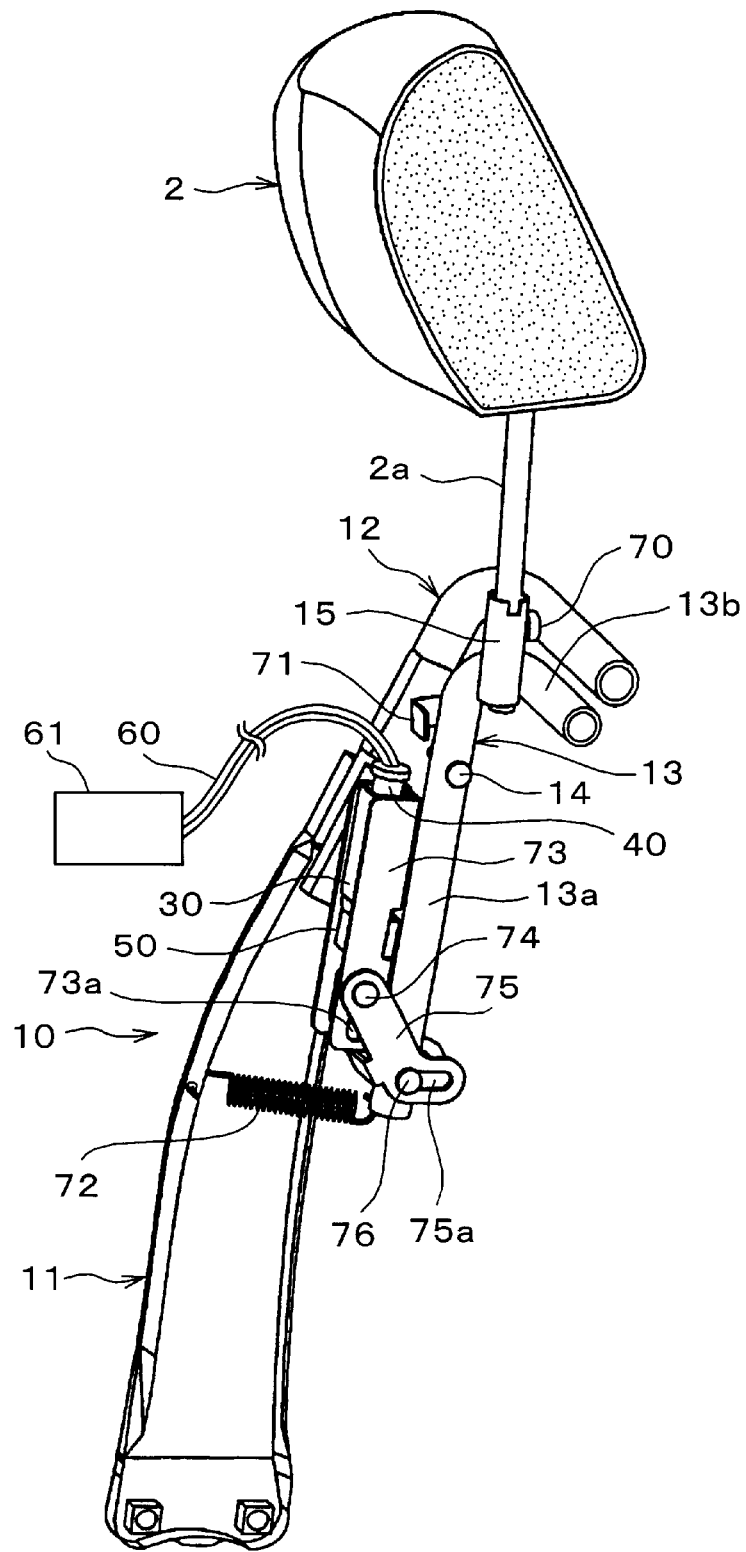
FIG. 5 is a perspective view of a part of a seat apparatus for a automobile in accordance with another embodiment of the present invention.

Next, a description will be given of another embodiment in accordance with the present invention with reference to FIG. 5. In FIG. 5, the same reference numerals are attached to the same constituting elements as those in FIG. 2, and descriptions thereof will be omitted accordingly.

In the present embodiment, a rubber 70 which is brought into contact with the upper frame 12 when the head rest 2 moves backward is adhered to a rear surface of the head rest holder 15 to which the stay 2a of the head rest 2 is detachably mounted. In contrast, a stopper 71 with which the head rest frame 13 is brought into contact when the head rest 2 moves forward is firmly fixed to the upper frame 12.

The head rest frame 13 is structured so as to be freely tilted around the tilting shaft 14 corresponding to a supporting point within a range from a most backward tilted position at which the rubber 70 is brought into contact with the upper frame 12 to a most forward tilted position at which the rubber 70 is brought into contact with the stopper 71. However, the head rest frame 13 is always urged in a backward tilting direction by a return spring 72 constituted by a coil spring mounted to a lower end portion, and generally stops at the most backward tilted position (a normal position) at which the rubber 70 is brought into contact with the upper frame 12. The rubber 70 is structured so as to prevent the head rest holder 15 from being directly in contact with the upper frame 12 so as to generate an abnormal noise. Furthermore, the return spring 72 is structured so that one end is engaged with a lower end portion of the head rest frame 13 and another end is engaged with the side frame 11, respectively, and is always in a tension spring state.

The gas actuator 30 provided with the cylinder portion 40 and the lock portion 50 is fixed to an inner side of the connecting portion between the side frame 11 and the upper frame 12 via a bracket 73. The actuator 30 in this case is structured so that the cylinder portion 40 is arranged at an upper side thereof, the lock portion 50 is arranged at a lower side thereof, and the internal rod 43 shown in FIG. 4 is arranged in a state of being parallel to the vertical pipe portion 13a of the head rest frame 13. That is, in accordance with this gas actuator 30, the rod 43 moves to a lower side at a time of operation.

A pin 74 is fixed to a front end of the rod 43 in the gas actuator 30. In contrast, a long hole 73a which is in parallel to a forward moving direction of the rod 43 is formed in the bracket 73, and the pin 74 is engaged so as to freely move along the long hole 73a. When the gas actuator 30 is operated and the rod 43 moves forward, the pin 74 is brought into contact with an inner edge in a lower end side of the long hole 73a, and this position forms a stroke end when the rod 43 moves forward.

One end of a substantially L-shaped link 75 is rotatably mounted to the pin 74. The link 75 extends in an obliquely lower side backward direction from a mounting portion to the pin 74, and extends substantially horizontally to a backward direction from a bent portion. A long hole 75a is formed in a horizontal portion of the link 75, and a pin 76 fixed to a lower end of the vertical pipe 13a in the head rest frame 13 is engaged with the long hole 75a so as to freely move along the long hole 75a. A tilting operation of the head rest frame 13 is allowed by a movement of the pin 76 along the long hole 75a. In a normal state in which the head rest frame 13 is urged in the backward tilting direction by the return spring 72, the pin 76 is brought into contact with the inner edge of the front end side of the long hole 75a.

Next, a description will be given of an operation of the seat apparatus mentioned above.

When the automobile is suddenly accelerated to the front side due to a rear-end collision or the like, and the acceleration sensor 61 detects an acceleration having a predetermined or greater value, the gas actuator 30 is operated, the rod 43 moves forward to the lower side, and the pin 74 moves to the lower side along the long hole 73a. In accordance with the movement of the pin 74, the link 75 pushes the lower portion of the head rest frame 13 in the backward direction via the pin 76 while rotating around the pin 76 corresponding to the supporting point. Then, the head rest frame 13 is tilted forward until being brought into contact with the stopper 71, and the head rest 2 is also tilted forward and moves to the front side. Accordingly, the head portion of the passenger M shown in FIG. 1 is supported by the forward tilting head rest 2.

In accordance with the present embodiment, the head rest 2 positively moves to the front side so as to support the head portion of the passenger M, whereby it is possible to reduce whiplash injury. Furthermore, since the state in which the rod 43 moves forward can be maintained by the ratchet gear 52a of the lock piece 52 in the lock portion 50 being engaged with the ratchet groove 43a of the rod 43 as described above, the forward tilting state of the head rest 2 can be continuously maintained even after the gas actuator 30 is operated.

Furthermore, in accordance with the present embodiment, in the case in which some load moving the head rest 2 to the front side from the normal state impinges and the head rest 2 is tilted forward, the head rest frame 13 is brought into contact with the stopper 71, whereby the head rest 2 is prevented from being tilted more forward, and when the load is removed, the head rest is returned to the original position by the return spring 72. The structure is made to be a buffering structure in which in the case in which the head rest 2 is tilted forward by the direct input as mentioned above, the pin 76 moves along the long hole 75a of the link 75, and the head rest frame 13 does not operate the link 75. Accordingly, an operation of moving forward the rod 43 of the gas actuator 30 does not occur. That is, a reverse operation in which the rod 43 moves forward when the head rest 2 is tilted forward does not occur, whereby a malfunction of the gas actuator 30 is prevented. In order to prevent the reverse operation from occurring, a stopper or the like which does not absolutely tilt the head rest 2 forward may be provided; however, in this case, a greater power for deforming the stopper so as to move the head rest frame 13 forward is required in the gas actuator, or the weight is increased for the purpose of securing a high rigidity. However, the problems mentioned above do not occur in the present embodiment.

In this case, in each of the embodiments mentioned above, the gas actuator 30 which tilts the head rest 2 forward is arranged in one side; however, a pair of right and left actuators may also be arranged.

As described above, in accordance with the present invention, since the structure is made such that when the acceleration sensor detects an acceleration having a predetermined or greater value, the gas actuator is operated and the head rest is tilted forward; however, it is possible to securely and sufficiently tilt the head rest forward without regard to the physical condition of the passenger, the driving condition of the automobile, or the structure of the seat back frame, so that it is possible to effectively reduce whiplash injury. Furthermore, since a compact gas actuator is sufficient to achieve the operation, it is possible to make the apparatus compact as desired.

What is claimed is:

1. A seat apparatus for an automobile, the apparatus comprising:

a seat back provided with a seat back frame;

a head rest frame supported to the seat back frame via a tilting shaft so as to be freely tilted in forward and rearward directions;

a head rest supported to an upper side of the tilting shaft in the head rest frame;

a gas actuator mounted to the seat back frame, operated due to a momentary gas generation and tilting the head rest frame in a direction in which the head rest is tilted forward at a time of the operation;

a holding device for maintaining an operating state of the gas actuator so as to maintain the state of the head rest; and an acceleration sensor for detecting an acceleration of the automobile in the forward and rearward directions, wherein the gas actuator is operated when the acceleration sensor detects a predetermined or greater acceleration.

2. A seat apparatus for a automobile as claimed in claim 1, wherein a buffering mechanism which allows the head rest frame to tilt forward when the load of forward tilting the head rest frame via the head rest is input to the head rest frame and prevents the gas actuator from being operated is provided between the head rest frame and the gas actuator.

3. A seat apparatus for a automobile as claimed in claim 2, furthermore comprising an urging member for urging the head rest frame to a normal position.

4. A seat apparatus for a automobile according to claim 1, wherein the holding device comprises:

a rod which is moved forward in an axial direction thereof by activation of the gas actuator;

a wedge member of which front end is directed counter to a direction of the forward movement of the rod; and a thrusting member having a side surface which forms a wedge-shaped space together with a side surface of the rod so as to accommodate the wedge member therein; wherein when the rod moves rearward, the wedge member is pressed into the wedge-shaped space between the thrusting member and the rod, thereby preventing further rearward movement of the rod.

5. A seat apparatus for a automobile according to claim 4, wherein a tooth portion is formed on the surface of the rod and the wedge member respectively, and the tooth portion engages each other.

* * * * *